Jan. 31, 1967  E. E. HABIB  3,301,644
FLEXIBLE RESIN - IMPREGNATED CLOTH BUFF
Filed March 14, 1963
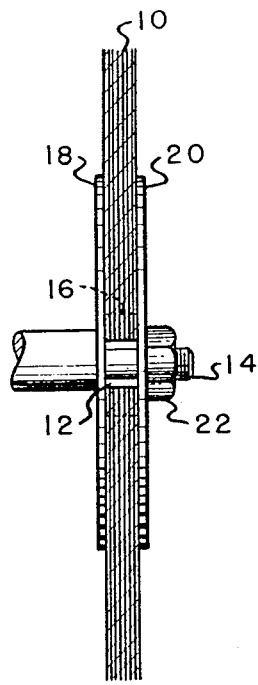
FIG.-2-
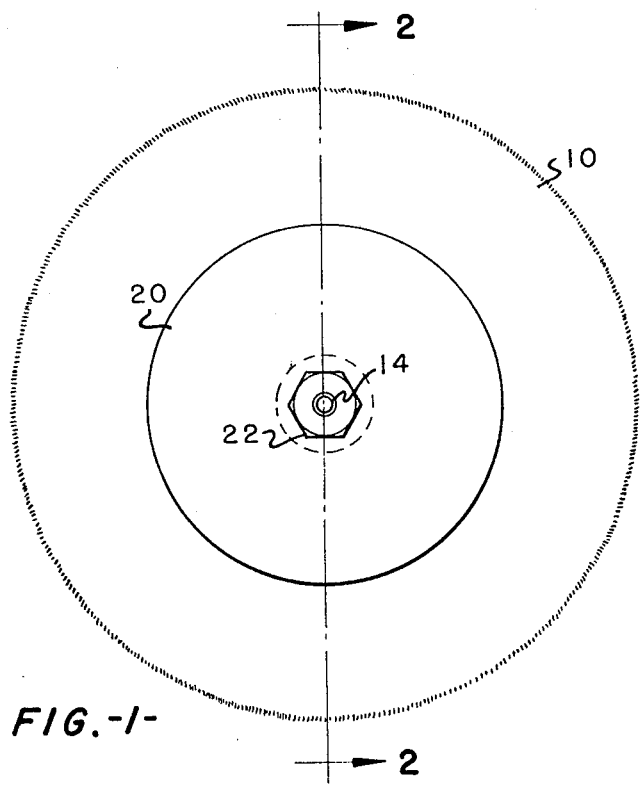
FIG.-1-
INVENTOR.
EMILE E. HABIB
BY
ATTORNEY

United States Patent Office 3,301,644
Patented Jan. 31, 1967

3,301,644
FLEXIBLE RESIN-IMPREGNATED CLOTH BUFF
Emile E. Habib, Spartanburg, S.C., assignor to Deering Milliken Research Corporation, Spartanburg, S.C., a corporation of Delaware
Filed Mar. 14, 1963, Ser. No. 265,151
9 Claims. (Cl. 51—297)

This invention relates to resin impregnated buff cloths and to the methods for the preparation of such buff cloths.

Buff cloths and especially buff cloths fabricated into buff wheels are widely employed for smoothing and polishing various metal fabrications and in most cases comprise a disc-shaped member formed from a plurality of layers of fabric. Theoretically, a buff cloth or buff wheel is a carrying agent for buffing compounds. The buff cloth or buff wheel, however, wear out because conventional fabrics are not specifically designed to withstand intense flex-abrasion, heat and general industrial abuse.

More important than the wear life of a buff cloth or buff wheel, however, is the ability of the buff cloth to perform increased amounts of work at faster rates. A buff wheel which can withstand heavy pressures without splaying or buckling will produce increased amounts of work and even more important will produce work at faster rates. The faster rate of work will also usually reduce the amount of buffing compound necessary in that the buff will have a shorter time in which to throw off buffing compound.

Fabrics of themselves are unable to stand up to heavy buffing pressures and must be modified with impregnants. To provide an improvement, the impregnant must be able to modify the fabric to withstand heavy pressures, heat and flexing and must be able to cause the fabric to retain appropriate amounts of buffing compound throughout the life of the buff fabric. The impregnant itself must be heat, abrasion and solvent resistant and have good strength flexibility and bonding properties. Heat-hardenable resins have been experimentally employed as buff cloth impregnants. While heat-hardenable or thermosetting resins have been found to improve buff fabrics when used as impregnants, the thermosetting resins have been found to have certain objectionable qualities in that the resins being brittle break down during flexure whereby the buff loses its load carrying capacity. Thermoplastic resins have also been employed as buff cloth impregnants. The thermoplastic materials in themselves, however, are not strongly abrasion resistant or solvent resistant. The thermoplastic resin impregnated buff cloths also have a tendency to become gummy when the buff cloth is heated by the friction and flexure to which it is subjected in ordinary buffing operations.

It can readily be seen that the ability of a buff cloth to withstand heavy buffing pressures without the buff cloth impregnant breaking down during repeated flexing as encountered in buffing is a very important property of a buff fabric. Without sufficient stiffness plus resiliency, the buff fabric is unable to withstand buffing pressure, the incorporation of nonflexible resin impregnants results in resin breakdown, loss of buffing compound and the exposure of easily abraded cloth. The flexibility, however, must be a flexibility which is not obtained at the expense of a loss in heat stability of the impregnating composition, that is to say, the impregnant must not become gummy when heat is generated within the buff fabric due to the heat normally generated in buffing operations.

It is an object of this invention to provide a resin impregnated buff cloth containing at least some thermosetting resin wherein the impregnated buff cloth has sufficient flexibility to be free from brittleness and breakdown tendencies upon encountering flexing under heavy pressures.

It is another object of this invention to provide a method for the preparation of a resin impregnated buff cloth containing at least some thermosetting resin wherein the impregnated buff cloth has sufficient flexibility to be free from brittleness and breakdown tendencies upon encountering flexing under heavy pressures.

In accordance with this invention it has been discovered that a buff fabric may be obtained which can perform increased work through its ability to withstand heat, pressure and constant flexing and which will retain sufficient quantities of buffing compound by treating a buff fabric with a polyurethane modified aldehyde resin condensation product. The impregnating composition may be the reaction product of a polyurethane and an "aldehyde resin condensation product." The phrase "aldehyde resin condensation product" as used herein is meant to include aminoplasts and phenoplasts, that is to say, the reaction products of aldehydes with amines and phenolics. The term "polyurethane" as used herein is meant to include those compounds containing the characteristic group

which encompasses the reaction product of polyisocyanate and a coreactant having at least two groups containing at least one active hydrogen atom as determined by the Zerewitinoff method. (Zerewitinoff, Ber., 40, 2023 (1907); Ber., 41, 2236 (1908); Kohler, J. Am. Chem. Soc., 49, 3181 (1927).) These materials contain at least two groups, or combinations thereof, such as —OH, —NH$_2$, —NHR, —COOH, —SH or groups which react similarly under reaction conditions. Such compounds include isocyanate terminated polyethers, polyesters and corresponding thio derivatives. In another embodiment, the reactive isocyanate groups may be blocked if so desired. The polyurethane employed should be a polyurethane which has the ability to flexibilize the aldehyde resin condensation product. More specifically, the polyurethane employed should be a polyurethane having a flexural yield strength greater than the flexural yield strength of the aldehyde resin condensation product.

Flexure yield strength is a measure taken from a polymeric resin strip as it is bent across its main axis. A standard method for this type of test is ASTM procedure D790-61. In this method, a bar of the polymeric material of rectangular cross-section is tested in flexure as a simple beam, the bar resting on two supports and the load being applied by means of a loading nose midway between the supports. Some materials may give load-deflection curves that show a point, Y, at which the load does not increase with an increase in deflection. In such cases, the flexural yield strength may be calculated in accordance with the equation:

$$\text{Flexural Yield Strength} = \frac{3PL}{2bd^2}$$

where $P$ = load at point Y on the load deflection curve, in pounds
$L$ = span in inches
$b$ = width of beam tested in inches
$d$ = depth of beam tested in inches.

A better understanding of the impregnated buff cloth of this invention may be had from a discussion of the drawings.

FIGURE 1 is an elevational view of one type of buff wheel formed from a plurality of layers of fabric and illustrated as being mounted in a suitable arbor, and FIGURE 2 is a cross-section view of the buff wheel of FIGURE 1 taken substantially along the line 2—2.

With reference to the drawings in greater detail, there is illustrated a plurality of circular layers 10 of fabric formed of surface coated cellulose fibers and having, in each instance, a central aperture 12 for receiving a spindle 14. The layers of fabric 10 may be stitched together in any suitable manner as indicated at 16 in FIGURE 2 of the drawings and are preferably arranged such that the weave of adjacent layers of fabric does not coincide since this prevents the wheel from becoming squared as a result of raveling.

The spindle 14 is provided with a fixed flange 18 which provides a measure of support for the buff, and the buff is held in position by means of a removable disc 20 and a nut 22 which is in thread-wise engagement with spindle 14.

In operation, a buffing compound of any suitable type is applied to the peripheral edge of the buff which is then rotated at a high rate. The work piece to be buffed is then brought into contact with the peripheral edge of the buff and is abraded and polished by frictional contact therewith. Either continually or at frequent intervals, additional buffing compound is applied to the peripheral edge of the buff to replace that which is lost in operation.

Buff wheels according to this invention may be conventional in construction except for the coating of the fabric layers thereof and may be of any conventional type. For example, buff wheels according to this invention may be of the full-disc-muslin type, supercut or pleated type, sewed-piece type, folded type, bias type, or ventilated type. Likewise, buffs according to this invention may be finger buffs, loose buffs, packed buffs or sewed buffs in which the stitching takes any conventional form as illustrated by a radially extending spiral or a plurality of radially extending rows of stitches. The invention is of particular interest with respect to buffs that operate at high r.p.m.

The fabric from which buff wheels according to this invention are made can be any type of cellulose fabric which, in an unmodified form, has been conventionally employed in the manufacture of buffs. Muslin fabrics are particularly well suited for the manufacture of buffs according to this invention and may have any standard thread count. For example, the fabric may be a 48 by 48, a 64 by 64, or an 86 by 93 weave fabric. As a general rule, the higher count fabrics are desirable since their higher initial cost is generally offset by increased wear life. The weight of the fabric employed in making buffs according to this invention may also vary within wide limits.

Fabrics formed from cellulose fibers derived from substantially any source are preferred for use in forming buffs according to this invention, and the fibers in such fabrics may be either natural or regenerated cellulose. Examples of suitable fabrics for use in this invention include cotton fabrics, viscose rayon fabrics, and linen fabrics. It is an advantage of this invention that viscose rayon fabrics may be employed with excellent results because such fabrics are most heat resistant and generally slightly less expensive than corresponding fabrics made from cotton. It should be understood, however, that the preferred fabrics do not exclude from use in this invention certain special types of fabrics such as for instance wool and silk and the like.

Polyurethanes which meet the prerequisite of having flexural yield strength greater than the flexural yield strength of the aldehyde resin condensation product are high molecular weight polyurethanes such as those polyurethanes derived from polyethers, polyesters and the thio derivatives thereof. In general, the active hydrogen bearing component employed in this invention should have molecular weights of not less than about 600.

*Polyether formulated polyurethanes*

Suitable polyether formulated polyurethanes may be water-soluble or water-insoluble polyurethanes having polymeric units of the formula:

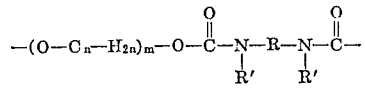

wherein R is a divalent nonreactive aliphatic or aromatic, preferably carbocyclic radical, e.g., lower-alkylene, containing from 2–8 carbon atoms, pyridylidene, thiophenylene, phenylene and substituted phenylene, e.g., tolylene, xylylene, paradiphenylene, naphthylene, etc., R' is hydrogen or —CH(R")—CH(R")—OH, R" being hydrogen or a nonreactive aliphatic or aromatic radical, e.g., lower-alkyl containing from 1 to 8 carbon atoms inclusive, phenyl, substituted phenyl, $n$ is an integer from 2 to 8 inclusive, preferably 2, and $m$ is an integer from about 15 to about 450, preferably about 45 to 225 and more preferably from 100 to 160. The integer $n$ can also be the average value resulting from the alkylene groups alternating between ethylene and e.g., propylene or a higher alkylene. The water solubility of these polyurethanes may be increased, if desired, by reaction with an epoxide as described in detail hereinafter.

The numerical values of $n$ and $m$ are determined by the starting polyalkylene ether glycol, e.g., $n$ is 2 when the polymer is a polyethylene ether glycol and $m$ is about 133 when the molecular weight of the starting glycol is about 6,000. R is a connecting radical between the isocyanate groups of the diisocyanate employed to produce these polymeric units, e.g., R is phenylene when m-phenylene diisocyanate is employed. R" is $$CH(R''')—CH(R''')—OH$$

when the resulting polyurethane (R=H) is further reacted with an epoxide, e.g., —CH(CH$_3$)—CH$_2$OH in the case of propylene oxide.

These polymeric units are present in polyurethanes of the formula:

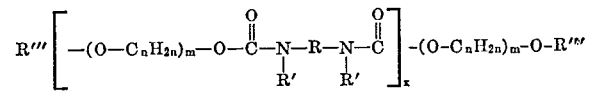

wherein R, R', $n$ and $m$ have the values given above and R''' is hydrogen or

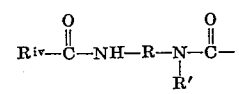

wherein R' has the value given above and R$^{iv}$ is the radical of the compound used to chain terminate the polymerization reaction, e.g., lower-alkoxy, aryloxy, aralkoxy, and $x$ is an integer greater than one, usually a value sufficient to provide a molecular weight of a hundred thousand or more for the resulting polymer. It will be apparent that $x$ increases in value as the polymerization reaction proceeds. No exact value can be ascribed to $x$ as the number varies considerably, depending upon the polymerization reaction conditions and is, at best, an average number. The desired degree of polymerization is best determined by the physical characteristics, e.g., viscosity film properties, of the resulting product.

The frequency at which R''' is H depends in part upon the molar ratio of diisocyanate to polyethylene ether glycol employed to produce this starting polyurethane. If the lowest possible ratio of 0.5 to 1 were employed, theoretically R''' should always be H and $x$ should be 1. However, to produce a starting polymer having the optimum properties, the molar ratio is preferably from about 1.0:1 to 1.5:1. Under these conditions, R''' should always be the alternate structure given above. However, because of this viscosity of the reaction mixture, neither of these theoretical conditions are probably reached and R''' is probably a mixture of the two alternative possibilities in the resulting polymer molecules.

The starting polyalkylene ether glycol diisocyanate polymers are prepared by reacting a substantially anhydrous polymer of a polyalkylene ether glycol, with at least 0.5, e.g., 0.6, 0.7, 0.8 and perferably at least about 1, e.g., 0.9 to 1.2 molar equivalent of a diisocyanate, preferably an aryl diisocyanate In practice, slightly more than 1 molar equivalent of diisocyanate is ordinarily preferred. Less than 2.0 and ordinarily less than 1.5 molar equivalents is used. The preferred molar ratio of diisocyanate to glycol is from about 1.0:1 to 1.2:1. If other isocyanate reactive groups are present in the reaction mixture, e.g., hydroxy groups, additional diisocyanate must be added if the above molar proportions are to be maintained. A 1:1 molar ratio of isocyanate groups to groups reactive to isocyanate groups is the preferred minimum ratio. The term "polyalkylene ether glycol" as used throughout this invention includes polyalkylene members such as for instance polyethylene, polypropylene, polytrimethylene, polytetramethylene, and polybutylene ether glycols.

Although the starting polyalkylene ether glycol polymer and reaction mixture should be substantially anhydrous, the latter preferably is not completely anhydrous as the reaction, to proceed in a desirable fashion, sometimes requires the presence of a trace of moisture, e.g., 10–500 parts per million on the polyalkylene ether glycol, to initiate the reaction. Thus, "substantially anhydrous" when used herein means containing less than 0.1% water. If the polymer solution is rendered anhydrous by distilling the aromatic solvent, water preferably is thereafter added in the range of about 100 to 200 parts per million.

A wide variety of diisocyanates can be used to prepare the starting polymers of this invention, but aryl, especially monophenyl diisocyanates are preferred. Suitable compounds include 2,4-tolylene diisocyanate, 2,6-tolylene diisocyanate, m-phenylene diisocyanate, 2,2'-dinitrodiphenylene - 4,4' - diisocyanate, cyclohexylphenyl-4,4'-diisocyanate, hexamethylene diisocyanate, diphenylene-4,4'-diisocyanate, diphenylmethane-4,4'-diisocyanate, di-para-xylylmethane - 4,4' - diisocyanate, naphthylene-1,4-diisocyanate and the corresponding 1,5 and 2,7-isomers thereof, fluorene-2,7-diisocyanate, chlorophenylene - 2,4-diisocyanate and dicyclohexylmethane-4,4'-diisocyanate.

Any catalyst known to be useful in the reaction of polyalkylene ether glycols with diisocyanate may be used in the present invention including the tertiary organic bases of U.S. Patent 2,692,874, e.g., triethylamine, pyridine, their acid salts, tri-n-butylphosphine and the like. However, it has been found that particularly good results are obtained by using organo-metallic salts, e.g., cobalt naphthenate and similar salts of lead, zinc, tin, copper and manganese. The organic radicals may be either aliphatic or aromatic residues. Ordinarily, only a very small amount of the organo-metallic catalyst is required, e.g., from about 0.1 to 0.001% of the reactants.

Although the reaction can be conducted in the absence of a solvent, i.e., as a melt, it is ordinarily preferred to conduct the reaction in an inert solvent to avoid working with too viscous mixtures. Generally speaking, it is preferred to operate with reaction mixtures having a viscosity of less than 1,000,000 cps. It is possible to reach this viscosity, when operating without solvent, before a reaction product is obtained which has optimum properties. Thus, it is ordinarily desirable to employ a reaction solvent. Toluene is preferred. From a mechanical point, it is advantageous to keep the reaction mass at a viscosity below about 800,000 cps. However, if too much of an inert solvent is employed, it tends to interfere with the reaction and slow it down. This effect can, to a certain extent, be overcome by the use of larger amounts of catalyst. It is ordinarily desirable to employ only that amount of solvent which will impart a viscosity to the reaction mixture in the range of about 100,000 to 1,000,000 cps., preferably around 300,000 to 800,000 cps. With toluene at 75 to 85° C., employing polyethylene ether glycol of a molecular weight in the range of 5,500 to 7,000, this can be accomplished at an initial concentration of about 80% solids. As the reaction proceeds, the increasing molecular weight of the reaction product increases the viscosity of the reaction mixture, thus necessitating the gradual addition of more solvent throughout the reaction, if about the same viscosity is to be maintained, e.g., until a final concentration of as low as 50% solids is reached. This serves two purposes, i.e., maintaining the desired viscosity and also slowing down the reaction. Thus, as the reaction product approaches water insolubility or gelation because of its increasing molecular weight, the reaction rate tends to slow down due to the presence of the increasing amounts of solvent. The amount of solvent employed can be varied considerably, e.g., from about 10% to 60% of the total reaction mixture.

The temperature of the polymerization reaction can be varied over a considerable range. The reaction proceeds slowly unless the temperature is above about 65° C. However, the temperature should not exceed 150° C., and preferably should not exceed 110° C. The preferred range is from about 70° C. to 90° C. The reaction time is a function of such factors as temperature, mixing speed, ratio of the reactants, water concentration and amount of catalyst and solvent employed.

Oxidation and discoloration of the reaction product can be avoided by conducting the polymerization reaction in an inert atmosphere, e.g., nitrogen, which also aids in the production of a more uniform reaction product.

If desired, the resulting polymer can be chain terminated in the manner described hereinafter, or epoxide modified as described below and then chain terminated or added directly to the resin.

This reaction can proceed concomitantly with the primary polymer production, e.g., as soon as some of the above-described polymer has been produced, it can be reacted with the epoxide. Thus, although the epoxide can be added at almost any point during the primary polymer reaction, the only requirement is that at least the terminal portion of the polymer production is conducted in the presence of the epoxide. The preferred procedure involves adding the epoxide to the reaction mixture for a few minutes, e.g., 1 to 15 minutes, before the polymer is chain terminated, if this procedure is followed.

The chain termination of a polymer is a well known reaction in polymer chemistry. In this step, the terminal, reactive groups of the polymer are reacted with a non-chain extending compound which inactivates these groups. In the instant polymer, the reactive terminal groups are isocyanate groups. These groups merely require a non-chain extending compound having an active hydrogen, i.e., those hydrogen atoms which display activity according to the well known Zerewitinoff test. See J. Am. Chem. Soc., 49, 3181 (1927). For a discussion of diiocyanate chemistry, see National Aniline Division of Allied Chemical and Dye Corporation Technical Bulletin I-17 and the references cited therein. For the purposes of this invention, such compounds are limited to those which do not form unstable intermediate groups or produce further polymerization, as would be apparent to those skilled in the art . Some polyfunctional compounds, i.e., those having a plurality of active hydrogens, are not preferred because of the tendency of some of these compounds to produce excessive cross-linking. The preferred chain terminating agents are thus those having only one active hydrogen. Suitable chain terminating agents are alcohols, water, ammonia, primary amines, cyclic secondary amines, acids, inorganic salts having an active hydrogen, mercaptans, amides, alkanol amines, oximes, etc. The preferred class of compounds are the organic monohydroxy compounds, preferably monohydroxy alcohols and especially the saturated aliphatic monoalcohols, aryl monohydroxy compounds and the like, which can be employed irrespective of the incidence of terminal isocyanate groups. Lower alkanols, i.e., containing from one to eight carbon atoms, inclusive, are preferred, especially those containing less than four carbon atoms. Methanol, ethanol, and isopropanol, being both efficient and inexpensive, are excellent chain terminating agents for terminating the polymerization reaction at the desired point. The polymer can also conveniently be chain terminated by adding enough water to produce the desired solids concentration and then distilling any organic solvent present in the mixture.

The minimum amount of chain terminating agent which should be employed will vary according to the ratio of diisocyanate to hydroxy groups present in the reaction mixture and the extent to which the polymerization reaction has proceeded. While a theoretical minimum may be readily calculated, e.g., 0.01–1 molar equivalents, it is preferred to add at least several molar equivalents, calculated on the diisocyanate used, as a safe excess.

A convenient method of chain terminating the polymerization of the polyurethane is to add an aqueous or alcohol solution of the resin to the polyurethane reaction mass at the point in the polymerization at which the desired degree of polymerization has occurred. The water or alcohol will chain terminate the polymerization.

The total polymerization time, including the epoxide modified portion, if this starting polymer is employed, can vary considerably depending, in part, on the molecular weight of the starting polyalkylene ether glycol, the reaction temperature, the catalyst and amount of solvent employed. If the reaction time is too short, under the selected conditions, a relatively low molecular weight reaction product is produced. Conversely, if the reaction time is too long, the reaction product may not be water-soluble.

The exact limits of reaction time, under a particular set of reaction conditions, can be determined by removing samples from the reaction mixture from time to time, chain terminating the sample with a lower alkanol, e.g., ethanol, and then making a 25% aqueous solution thereof, while removing whatever reaction solvent may be present. If the 25% aqueous solution has a viscosity at 25° C. of at least 2,000 cps., and preferably at least 8,000 or more, the desired reaction product can be obtained from the reaction mixture upon chain termination thereof. Obviously, if the alcohol stopped sample is water-insoluble, the reaction has proceeded too far and the reaction time was too long.

Another convenient index for determining the course of reaction is the viscosity of the reaction mixture. If the reaction is conducted at 75 to 85° C. with toluene as a reaction solvent, a 65% solution of the reaction mixture should have a viscosity in the range of 50,000 to 1,000,000 cps. As stated before, such a reaction mixture produces a highly satisfactory reaction product if chain terminated at a viscosity of around 200,000–800,000 cps.

In carrying out a preferred method of the above-described process, a polyethylene ether glycol having an average molecular weight of about 6,000 is melted under nitrogen. Toluene is then added and any water present in the glycol is removed by azeotropic distillation at reduced pressure until the mixture is substantially anhydrous. The cobalt naphthenate is then added followed by the tolylene diisocyanate. Water in an amount of about 150 parts per million is then slowly added. As the reaction proceeds and the viscosity increases, more solvent is slowly added to keep the viscosity within the range of about 200,000 to 300,000 cps. When a 65% solution of the reaction mixture reaches at least 200,000 cps., about 2 molar equivalents of propylene oxide, calculated on the tolylene diisocyanate, is added. When the desired ultimate viscosity of about 500,000 cps. is reached, any excess proplyene oxide is removed at reduced pressure and a molar excess, calculated on the tolylene diisocyanate, of ethanol is added as a chain terminating agent. Water is then added and the toluene is stripped from the mixture at reduced pressure. The aqueous residue can then be diluted to a standard concentration.

*Polyester*

The polyester portion of the polyurethane is conveniently prepared by reacting two polyfunctional ingredients, one of which is a carboxylic acid and the other a polyhydric alcohol. The combination of bifunctional ingredients employed in preparing the polyesters suitable for purposes of this invention are preferably combinations which will produce a polyester having a molecular weight of at least about 700. Combinations of bifunctional ingredients which will produce polyesters within the desired molecular weight are combinations such as, for instance, higher fatty acids reacted with polyhydric alcohols to produce polyesters of the alkyd resin type and also reacting high molecular weight polyols such as polyethylene glycol, polypropylene glycol, polytrimethylene glycol, polytetramethylene glycol, and polybutylene-ether glycol with dicarboxylic acids such as, for instance, malonic acid, succinic acid, adipic acid, methyladipic acid, maleic acid, carbonic acid, dihydromuconic acid, thiodipropionic acid, diethyl ether-dicarboxylic acid, sebacic acid, suberic acid, and higher dicarboxylic acids. It should be understood that hydroxy carboxylic acids may also be employed as well as mixtures of acids and glycols so as to produce mixed polyesters. It is preferred that the polyester be a hydroxy terminated polyester rather than a carboxyl terminated polyester. Where carboxyl terminated polyesters are employed, it is desirable to use bifunctional additives which will react with the carboxyl group so as to block the carboxyl group from any subsequent reaction with a diisocyanate. The reaction between the diisocyanate and carboxyl groups is undesirable in that blisters or bubbles are generated through the formation of trapped $CO_2$.

The polyesters prepared in the aforementioned manner are then reacted with diisocyanates in approximately equal molecular proportions. Suitable diisocyanates are diisocyanates such as, for instance, toluene diisocyanate, naphthalene-1,5 diisocyanate, 3,3'-dichlorodiphenyl-4,4' diisocyanate and the diisocyanates of the pyrene, fluorene and chrysene series. Polyisocyanates are also suitable reactants with the polyesters prepared in the aforementioned manner. Examples of suitable polyisocyanates are polyisocyanates such as, for instance, 4,4',4''-triisocyanato triphenyl methane, 1,3,5-triisocyanato benzene, and 2,4,6-triisocyanato toluene and the like.

*Aldehyde modification*

Any of the polyurethanes previously discussed may be aldehyde modified. A wide variety of aldehydes can be employed, both aromatic and aliphatic. The aldehyde can be monoaldehydic or polyaldehydic. It is preferred if the aldehyde has no groups other than aldehydic which can be reacted with the starting polymer. Examples of aldehydes, e.g., aliphatic, preferably containing one to twelve carbon atoms, include formaldehyde, acetaldehyde, propionaldehyde, butyraldehyde, nonaldehyde, formylcyclohexane, and other lower aliphatic and alicylic monofunctional aldehydes, glyoxal, pyruvaldehyde, ethylglyoxal amylglyoxal, and other α-carbonyl lower aliphatic aldehydes, benzaldehyde, cinnamaldehyde, phenylacetaldehyde, α-naphthaldehyde, pyrocatechualdehyde, veratraldehyde, α-formylthiophene, α-formylfuran, and other substituted and unsubstituted aromatic aldehydes, dialdehyde starch, and other aldehyde carbohydrates and aldehydic cellulosic materials. The preferred aldehydes are the lower, e.g., containing from one to twelve carbon atoms, inclusive, aliphatic and carbocyclic aromatic monoaldehydes. Formaldehyde is the aldehyde of choice. These aldehydes may also be used in the preparation of thermosetting resins as set forth hereinafter.

The reaction of the starting polymer with the selected aldehyde can be conducted at any convenient temperature, e.g., 0° to 100° C., although a temperature between about 20° C. and 85° C. is more desirable and between about room temperature and about 70° C. preferred. If it is desired to have the reaction reach completion very rapidly, a temperature of about 70° C. should be employed.

The reaction can be conducted at any pH between about 3 and about 10. Outside this range, the starting and resulting polymers tend to be unstable. Ordinarily, it is preferred to stay within the range of about 3.5 to about 9.

*Phenoplast*

The term "phenoplast" as used herein includes the resinous materials made from phenols and aldehydes. These resins are also conveniently termed phenolics or tar-acid resins. The phenols made synthetically are derived from coal tar and primarily comprise phenol itself, cresols, xylenols and resorcinol. The most widely used phenolic resin is phenol-formaldehyde although other suitable resins include phenol-furfural, p-tertiary-amyl phenol-formaldehyde, p-tertiary-butyl phenol - formaldehyde, cresol-formaldehyde, cresol-xylenol-formaldehyde cresylic acid-formaldehyde, phenol-p-tertiary-butylphenol-formaldehyde, phenol - cresol - formaldehyde, phenol-cresol - xylenol - formaldehyde, phenol-cresylic acid-formaldehyde, phenol-resorcinol - formaldehyde, resorcinol-formaldehyde, xylenol-formaldehyde, phenol-formaldehyde-aniline and sulfonated phenol-formaldehyde. In addition to the unmodified phenolic resins, those modified with other additives, particularly those containing natural resins, such as rosin and rosin esters are applicable. Among these are the modified phenolic resins, for example, bisphenol-formaldehyde rosin and rosin esters, p-tertiary-butylphenol - formaldehyde - rosin and rosin esters, phenol-formaldehyde-glycerol-rosin and rosin esters and phenol - formaldehyde-rosin and rosin esters.

The resinification of phenols with aldehydes proceeds in three stages: resoles or A stage resins, resitols or B stage resins and resites or C stage resins. The resoles are low molecular weight resins which are soluble in water, alkali, alcohols and ketones. Some methyl groups derived from the aldehyde undergo condensation with ortho and parahydrogen atoms in adjacent molecules to yield methylol phenols linked by means of methylene bridges. The resitols are higher molecular weight resins of the same type, no longer soluble in alkali. The higher molecular weight is obtained by additional condensation under the influence of heat and catalyst. These intermediate products are not well defined chemically but the complexity in the branching is believed to have increased although the crosslinking has not proceeded very far. Although these resins soften under the influence of heat, they are hard and brittle while cold. In the resites, essentially complete condensation of the original methylol groups has taken place and the resulting resin is insoluble and infusible. In this stage, the resin is considerably crosslinked and is said to be cured, thermoset or thermohardened, as the condensation reaction has proceeded in all three dimensions.

PROCESS VARIABLES

The preparation of phenolic resins is a well-known and commercial process. Many factors, all of which are well known, control the condensation of the phenol and aldehyde and these same factors affect the reaction of the resulting resin with the water-soluble polyurethane.

It is well established that the first step in the phenol-aldehyde condensation, in alkaline medium, involves the formation of phenol alcohol with a molar phenol-formaldehyde ratio of 1 to 1.0. Orthohydroxybenzyl-alcohol, as well as the para-isomers, are formed as the principal products. With an excess of formaldehyde, phenol dialcohols as well as the trialcohols are formed, although in every instance the distribution of methylol phenol occurs. The methlyl (hydroxymethyl) groups, activated by the phenolic hydroxyl groups, are extremely reactive and are responsible for the condensation reaction leading to the resinification of phenol alcohols.

If the phenol-aldehyde ratio is greater than 1, the resins obtained in an acid medium are permanently fusible and soluble. Very little if any crosslinking is exhibited in these resins and they are termed novolacs. The novolacs consist essentially of a chain wherein the phenol nuclei are connected by means of methylene bridges. The mean molecular weight of this resin is usually less than about 1,000. Novolac reacts with formaldehyde under alkaline conditions with the formation of methylol groups which can then condense while under the influence of heat and pressure, thus yielding products which are equivalent to the resites. Preferably, the polyurethane is added to the resin at the novolac stage to insure complete and uniform reactivity with the resin.

The respective amounts of phenol to aldehyde determine enormously whether the resulting resin is a two-dimensional and thermoplastic resin or a crosslinked and thermosetting resin. It is obvious that the phenol-aldehyde ratio must be less than 1 to obtain a fully cured resin. In the case of phenol-formaldehyde resins, the ratio usually lies between about 1/1.1 and about 1/1.5 for molding and laminating resins.

Since the physical structure of phenolic resins has been the subject of considerable speculation, and no clear explanation has been made regarding the structure of these resins, the structure of the product of these resins with polyurethanes cannot be defined herein although it is believed that the product of this reaction is a copolymer of the reactants linked by methylene bridges. Consequently, these copolymers will be defined as the reaction products of phenolic resins and water-soluble polyurethanes.

*Aminoplasts*

By "aminoplasts" as used herein, it is meant the reaction products of amines and aldehydes. Although the resins provided contain amido rather than the amino group, this terminology is utilized in order to conform to the conventional understanding of the term throughout the art. The most commercially important amino resins are the urea formaldehyde and the melamine formaldehyde condensates. The other materials, the sulfonamide, aniline and thiourea resins, are in the development stage and large markets have not as yet been established for them.

In general, the amino resins are formed by condensing an amine with an aldehyde. The simplest reaction products of urea and formaldehyde are the methylol ureas. One process for the preparation of these resins consists of stirring one mole of urea with two moles of 37% formalin at 25 to 30° C. in alkaline solution until the aldehyde is completely reacted.

Monomethylolurea can be made in the same manner, using but one mole of formalin to one mole of urea, and cooling the reaction vessel with ice. Formalin is then added to a 50% aqueous solution of the urea, to form the white crystalline solid monomethylolurea which melts at 111° C. and is soluble in cold water and in warm methanol. Dimethylolurea melts at 126° C. to a clear liquid which solidifies on further heating. Dimethylolurea is also soluble in cold water and in warm alcohol.

Although the polyurethane of this invention may be added at any time during the condensation of the urea and the aldehyde, it is preferred to add the polyurethane to the amino resin as its molecular weight approaches about 1,000. The resulting admixture is rapidly converted, by curing, to an insoluble reaction product. It has not been definitely determined whether the final cured resin is linear or cyclic in nature and it is similarly not clear whether the reaction product of these resins with the water-soluble polyurethanes is linear or cyclic. Consequently, these resins will be defined herein as the reaction products of amino resins and water-soluble polyurethanes.

The conditions of reaction of melamine with aqueous formaldehyde are somewhat different from the reactions of urea. Because of the low solubility of melamine in water, the reactions are usually conducted at temperatures of 80 to 100° C. to bring the melamine into solution more readily. The amino groups of melamine can each add two methylol groups, while urea, apparently only one mole of formaldehyde adds to each amino group. Hexamethylolmelamine is formed by heating melamine at 90° C. with an excess of neutral formaldehyde or at room temperature for 15 hours. The polyurethane is preferably added after some condensation has occurred.

Just as with the phenolic resins, it is not possible to identify definitely the structures of the cured amino resins per se, and similarly it is not possible to define exactly the structure of the resin reacted with the water-soluble polyurethane. It is believed, however, that copolymers linked by methylene bridges are formed during the reaction.

In preparing the buff fabrics of this invention, a one-step resin impregnation process is carried out, that is to say, the fabric is impregnated in a single operation such as, for instance, a padding operation, a printing operation or a simple immersion operation. It should be noted that all of the aforementioned operations are operations which are commonly carried out in textile mills with readily available apparatus. The impregnating composition itself may be a solution of the preformed polyurethane resin and the preformed aldehyde resin condensation product or may be a solution those constituents necessary to prepare a polyurethane (a hydroxy rich polyester or polyether and a diisocyanate) and an aldehyde resin condensation product. Where the polyurethane resin has been prepared in advance, the method of application is either from a water soluble polyurethane or from what is commonly known as a prepolymer application. When the formation of the polyurethane takes place simultaneously with copolymerization with the aldehyde resin condensation product, the method of application is known as a "one-shot" application.

*Prepolymer reaction*

Prepolymers are products wherein some isocyanate groups are pre-reacted and wherein the reaction will proceed to completion in the presence of minor amounts of water. The reactivity of the free isocyanate groups are usually temporarily inhibited by blocking these groups with alkoxy radicals. When, however, the prepolymer is subjected to heat, the alkoxy groups are driven off and the unreacted isocyanate groups of the prepolymers are again reactive groups. While some prepolymers are water-soluble compounds, it has been found that the impregnating composition consisting of a polyurethane prepolymer and an aldehyde resin condensation product must be carried in a water-alcohol solvent or an all-organic solvent such as, for instance, diethyl ketone, methylethyl ketone, acetone and the like. The ratio of polyurethane prepolymer to aldehyde resin condensation product is dependent upon the flexural yield strength of the specific polyurethane employed. It is obvious that where the polyurethane is an extremely flexible material, the polyurethane need only be employed in minor amounts in order to fiexibilize the aldehyde resin condensation product. Where, however, the polyurethane employed has a flexural yield strength only slightly in excess of that of the aldehyde resin condensation product itself, major amounts of the polyurethane must be employed in order to impart the desired amount of flexibility to the aldehyde resin condensation product.

*One-shot*

The so-called "one-shot" process is a term which is descriptive of a process peculiar to the polyurethane industry. In this type of process, the reactants for a polyurethane (a polyisocyanate and a polyether or polyester) are directly formulated into a polyurethane as opposed to a process wherein a prepolymer is formed prior to formulation of the final polyurethane composition. The one-shot process as carried out in this invention involves the formulation of a polyurethane in the presence of an aldehyde resin condensation product or more specifically the formulation of a polyurethane simultaneous to the copolymerization of the polyurethane with the aldehyde resin condensation product. In order for a process of this type to be successful, the polyisocyanate component must have a higher degree of affinity for the polyether or polyester than for the aldehyde resin condensation product, that is to say, the polyisocyanate must react to form a polyurethane rather than coupling with the aldehyde resin condensation product. In general, it is preferable that a catalyst for the reaction of active hydrogen atoms with isocyanates be incorporated in the one-shot coating composition.

The preferred group of catalysts selected from that group having the aforementioned characteristics are the organo-tin compounds and especially stannous octoate.

Among the classes of catalysts which can be used, there are included the inorganic and organic bases such as sodium hydroxide, sodium methylate, sodium phenolate, tertiary amines and phosphines. Particularly suitable amine catalysts include 2,2,1-diazabicyclooctane, trimethylamine, 1,2-dimethylimidazole, triethylamine, diethyl cyclohexylamine, dimethyl long-chain $C_{12}$ to $C_{18}$ amines, dimethylaminoethanol, diethylaminoethanol, N-methyl morpholine, N-ethyl morpholine, triethanolamine and the like. Other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene gylcol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, and mercury salts.

Organo-tin compounds characterized by at least one direct carbon to tin valence bond are also suitable as catalysts.

Among the many types of tin compounds having carbon to tin bonds, of which specific representative compounds have been tested and shown to be active, are tin compounds having the general formulae as follows:

(a) $R_3SnX$
(b) $R_2SnX_2$
(c) $RSnX_3$
(d) $R_2SnY$
(e) $RSnOOR'$
(f) $R(SnOOR')_2$
(g)

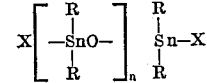

(h) $R_2Sn(YRX)_2$ in which the R's represent hydrocarbon or substituted hydrocarbon radicals such as alkyl, aralkyl, aryl, alkaryl, alkoxy, cycloalkyl, akenyl, cycloalkenyl, and analogous substituted hydrocarbon radicals, the R"s represent hydrocarbon or substituted hydrocarbon radicals such as those designated by the R's or hydrogen or metal ions, the X's represent hydrogen, halogen, hydroxyl, amino, alkoxy, substituted alkoxy, acyloxy, substituted acyloxy, acyl radicals or organic residues connected to tin through a sulfide link, and the Y's represent chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallytin dibromide, diallyltin diiodide, bis(carboethoxymethyl)-tin diiodide, dibutyltin dimethoxide, dibutyltin dibutoxide,

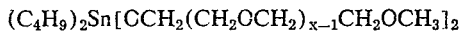

(in which $x$ is a positive integer), dibutyl-bis O-acetylacetonyl-tin, dibutyltin-bis(thiododecoxide), and

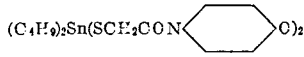

all readily prepared by hydrolysis of the corresponding dihalides. Many commercially available compounds used as stabilizers for vinyl resins are also included in this group.

Among the compounds that are representative of group (c) are butyltin trichloride, octlyltin trichloride, butyltin triaceate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, $$[HOOC(CH_2)_5]_2SnO$$

and $$[CH_3OCH_2(CH_2OCH_2)_{x-1}CH_2]_2SnO$$
$$[CH_3OCH_2(CH_2OCH_2)_{x-1}CH_2O(CH_2)_5]_2SnO$$

(in which the $x$'s are positive integers).

Methylstannonic acid, ethylstannonic acid, butylstannonic acid, octylstannonic acid, $$HOOC(CH_2)_5\text{—}SnOOH$$

$$(CH_3)_3N(CH_2)_5SnOOH$$
$$CH_3OCH_2(CH_2OCH_2)_{x-1}CH_2SnOOH$$

and $$CH_3OCH_2(CH_2OCH_2)_{x-1}CH_2O(CH_2)_5SnOOH$$

are examples of group (e) catalysts and group (f) catalysts are represented by $HOOSn(CH_2)_xSnOOH$ and $$HOOSnCH_2(CH_2OCH_2)_xCH_2SnOOH$$

the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17-M (a dibutyl tin compound believed to contain two sulfur-containing esters groups), Advastab T-50-LT (a dibutyl tin compound believed to contain two ester groups), are typical, as well as many other organo-tin compounds available under such trade names as "Advastab," "Nuostabe," and "Thermolite."

When a cataylst is employed in the impregnating composition, it is desirable to employ a "non-reactive" solvent as the carrier for the components of the impregnating composition. By "non-reactive" as used herein is meant a solvent in which the reactivity between the isocyanate of the polyurethane and the active-hydrogen containing components of the aldehyde resin condensation product, even in the presence of catalysts, is substantially inhibited. Small amounts of reactive solvents may be present provided the amount present is sufficiently low as not to precipitate a substantial amount of the components with which it is reactive.

Suitable organic solvents include halogenated hydrocarbons, such as trichlorethylene, methylene chloride, percholorethylene, ethylene dichloride, chloroform and the like; aromatic solvents such as toluene, xylene, benzene, mixed aromatics, such as the Solvesso types and the like, n-butyl acetate, n-butyl ether, n-butyl phosphate, p-dioxane, ethyl oxalate, methyl isobutyl ketone, pyridine, quinolene, N,N-dimethylformamide, N,N-dimethylacetamide, 2,2,4-trimethylpentane and the like. Mixtures of solvents may be used.

The use of a non-reactive organic solvent enables the practitioner to combine all desired components in a single solution and reaction therebetween is substantially inhibited, thereby greatly facilitating application of all components, even catalysts, uniformly onto the desired structure in controllable amounts. In the absence of a non-reactive solvent, the combined components and catalysts would react, often quite readily, to produce an insoluble polymer which cannot be conveniently applied to the fabric or other structure uniformly in the amounts desired. This reaction, however, is inhibited when a non-reactive solvent is used and the inhibiting influence substantially continues in the fabric until the solvent is removed by any conventional drying technique. After the solvent is removed, the various components are free to cure on the fibrous elements making up the fabric base.

The coating or impregnating composition of this invention may be applied to a fabric by any of the coating operations well known to the art. The coating composition itself may be of the water-soluble polyurethane type, the water-insoluble polyurehtane type, the one-shot type or the prepolymer type. In general, the solid content of the coating composition is such that from about a 2% by weight to about a 35% by weight pickup on the fabric is effected and preferably such that about a 5% by weight to about a 15% by weight pickup is effected. The impregating composition may be printed, padded, applied by simple immersion operations or in the event that the impregnating composition is thick enough, the composition may be applied by knife coating to the fabric. The coated fabric is then dried at temperatures of from about 150° F. to about 220° F. and then subjected to a curing operation at temperatures of from about 200° F. to about 375° F.

The following specific examples of the preparation of coated fabrics suitable for the preparation of a buff are given for purposes of illustration and should not be considered as limiting the spirit or scope of this invention.

EXAMPLE I

A coating composition is formulated as follows:

|  | Parts Dry Basis | Parts Wet Basis |
| --- | --- | --- |
| Polyurethane [1] (32.2% solids) | 13.75 | 42.7 |
| Water |  | 15.0 |
| Isopropanol |  | 39.3 |
| Phenolic Resin [2] (67% solids) | 13.75 | 20.5 |
| Water |  | 78.3 |
| Isopropanol |  | 34.2 |

[1] Water-soluble reaction product of tolylene 2,4-diisocyanate and polyethylene glycol (molecular weight 6,000) prepared according to U.S. Patent Serial No. 3,061,470.
[2] Resin No. 21544 a B stage phenol formaldehyde resin marketed by the Durez Plastics Co.

The alcohol and water are added separately to the aqueous solutions of the phenolic resin and the polyurethane after which the two solutions are stirred to provide a uniform mixture. The mixture is applied by padding an 80 square weave cotton muslin fabric in a manner such that 8% to 9% by weight of solids are deposited on the fabric. After padding and squeezing, the fabric is passed open width through a dryer for 15 to 20 seconds at 210° F. to drive out most of the alcohol and then passed through a standard tenter-frame dryer at about 240 to 260° F. for 2½ to 3 minutes to finish the drying. The fabric is then passed through a festoon curing oven for 1½ minutes at about 375° F. The treated and cured buff is then formed into pleated buffs. The buffs are buffs having a greately improved work function.

EXAMPLE II

A coating composition is formulated as follows:

|  | Parts Dry Basis | Parts Wet Basis |
|---|---|---|
| Phenolic Resin [1] (70% solids) | 20 | 28.6 |
| Polyurethane [2] (35% solids) | 20 | 57.2 |
| Ethyl Alcohol |  | 40.0 |
| Water |  | 27.3 |
|  | 40 | 153.1 |

[1] Resin No. 12704, an A stage phenol formaldehyde resin marketed by Durez Plastics Co.
[2] Water-soluble reaction product of diphenylmethane 4,4'-diisocyanate and polyethylene glycol (molecular weight 6,000) prepared according to U.S. Patent Serial No. 3,061,470.

The alcohol and water are added to the aqueous solutions of the phenolic resin and the polyurethane separately after which the two solutions are stirred to provide a uniform mixture. The mixture is then applied by means of a simple dipping operation to an 80 square weave cotton muslin fabric, the dipped fabric then being passed into the nip of a pair of squeeze rolls so as to provide a 10% by weight solids pickup on the fabric. The treated fabric is then dried for about 3 minutes at a temperature of approximately 200° F. The coated and dried fabric is then cured for 2 minutes at about 350° F. and is then formed into buff wheels. The buffs are buffs having a greatly improved work function.

EXAMPLE III

A coating composition is formulated as follows:

|  | Parts Dry Basis | Parts Wet Basis |
|---|---|---|
| Phenolic Resin [1] (68.6% solids) | 50 | 72.9 |
| Polyurethane [2] (35% solids) | 50 | 142.8 |
| Isopropyl Alcohol |  | 227.3 |
|  | 100 | 444.0 |

[1] Resin No. 18948, a B stage phenol formaldehyde resin marketed by Durez Plastics Co.
[2] Water-soluble reaction product of tolylene 2,4-diisocyanate and polyethylene glycol (molecular weight 6,000) prepared according to U.S. Patent Serial No. 3,061,470.

The alcohol is added to the aqueous solutions of the phenolic resin and the polyurethane separately after which the two solutions are stirred to provide a uniform mixture. The mixture is then padded on an 80 square weave cotton muslin fabric in a manner such that 10% by weight of solids are deposited on the fabric. The treated fabric is then dried for 5 minutes at 200° F. and then cured for 2 minutes at 350° F. The fabric is then formed into buffs which are found to have an improved work function.

What is claimed is:
1. A cloth buff consisting essentially of a coated cotton fabric, said fabric being coated with from about 2 to about 35% by weight of aldehyde resin condensation product containing a minor proportion, sufficient to impart flexibility to the resin condensation product, of a polyurethane.

2. The cloth buff of claim 1 wherein said polyurethane is characterized by polymeric units of the formula

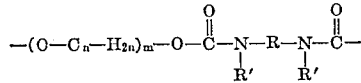

wherein R is selected from the group consisting of divalent non-reactive aliphatic and aromatic radicals; R' is selected from the group consisting of hydrogen and —CH(R")—CH(R")—OH wherein R" is selected from the group consisting of hydrogen, non-reactive aliphatic radicals and non-reactive aromatic radicals; $n$ is an integer from 2 to 8 inclusive, and $m$ is an integer from about 15 to about 450.

3. A cloth buff consisting essentially of a plurality of layers of fabric and having a peripheral surface of generally circular configuration, said fabric being impregnated with from about 2 to 35% by weight of a composition consisting essentially of a thermosetting aldehyde resin condensation product containing a minor proportion, sufficient to impart flexibility to the resin condensation product, of a polyurethane said aldehyde resin condensation product being selected from the group consisting of aminoplast and phenoplast.

4. The cloth buff of claim 3 wherein said fabric is a cellulose fabric.

5. The cloth buff of claim 3 wherein said fabric is cotton.

6. A cloth buff consisting essentially of a plurality of layers of fabric and having a peripheral surface of generally circular configuration, said fabric being impregnated with from about 2 to 35% by weight of a composition consisting essentially of a thermosetting aldehyde resin condensation product containing a minor proportion, sufficient to impart flexibility to the resin condensation product, of a polyurethane.

7. A cloth buff consisting essentially of a plurality of layers of fabric and having a peripheral surface of generally circular configuration, said fabric being impregnated with from about 2 to 35% by weight of a composition consisting essentially of a thermosetting aldehyde resin condensation product containing a major proportion, sufficient to impart flexibility to the resin condensation product, of a polyurethane, said aldehyde resin condensation product being selected from the group consisting of aminoplast and phenoplast.

8. A cloth buff consisting essentially of a plurality of layers of fabric and having a peripheral surface of generally circular configuration, said fabric being impregnated with from about 2 to 35% by weight of a composition consisting essentially of the reaction product of a thermosetting aldehyde resin condensation product and a minor proportion, sufficient to impart flexibility to the resin condensation product, of a polyurethane, said polyurethane being produced from a reactive hydrogen bearing organic component having a molecular weight in excess of 600, and said aldehyde resin condensation product being selected from the group consisting of aminoplast and phenoplast.

9. The cloth buff of claim 8 wherein said polyurethane is selected from the group consisting of isocyanate terminated polyethers, polyesters and corresponding thio derivatives.

References Cited by the Examiner
UNITED STATES PATENTS

| 2,532,248 | 11/1950 | Upper et al. | 51—297 X |
| 2,698,504 | 1/1955 | Lotz | 161—42 X |
| 3,027,247 | 3/1962 | Gagarine | 171—143 X |
| 3,044,891 | 7/1962 | Lauchenauer et al. | 117—161 X |
| 3,061,470 | 10/1962 | Kuemmerer | 117—144 X |
| 3,135,711 | 6/1964 | Thoma et al. | 117—143 X |

WILLIAM D. MARTIN, *Primary Examiner.*

R. HUSACK, *Assistant Examiner.*